(12) United States Patent
Huang et al.

(10) Patent No.: US 6,298,103 B1
(45) Date of Patent: Oct. 2, 2001

(54) FLEXIBLE CLOCK AND DATA RECOVERY MODULE FOR A DWDM OPTICAL COMMUNICATION SYSTEM WITH MULTIPLE CLOCK RATES

(75) Inventors: Shouhua Huang, San Clemente; Bar-Giora Goldberg, San Diego, both of CA (US)

(73) Assignee: Sorrento Networks Corporation, San Diego, CA (US)

( * ) Notice: Subject to any disclaimer, the term of this patent is extended or adjusted under 35 U.S.C. 154(b) by 0 days.

(21) Appl. No.: 09/098,410

(22) Filed: Jun. 16, 1998

(51) Int. Cl.[7] .............................. H04L 7/00; H03D 1/00; H04D 7/02

(52) U.S. Cl. .......................... 375/355; 375/340; 375/361

(58) Field of Search .................................... 375/316, 340, 375/355, 261, 279, 280, 360, 361, 351; 455/130

(56) References Cited

U.S. PATENT DOCUMENTS

| | | | |
|---|---|---|---|
| 2,979,662 | 4/1961 | Farrow | 327/162 |
| 3,933,454 | 1/1976 | DeLuca . | |
| 3,940,278 | 2/1976 | Wolf . | |
| 3,950,075 | 4/1976 | Cook et al. . | |
| 3,959,601 | 5/1976 | Olevsky et al. | 375/376 |
| 3,960,531 | 6/1976 | Kohanzadeh et al. . | |
| 3,982,151 | 9/1976 | Ludovici et al. . | |
| 3,999,836 | 12/1976 | Wolf . | |
| 4,017,013 | 4/1977 | Hawk et al. . | |

(List continued on next page.)

FOREIGN PATENT DOCUMENTS

WO 99/66668  12/1999  (WO) ............... H04L/7/027

OTHER PUBLICATIONS

Brochure, GigaMux Series DWDM Fiber Optic Transmission Systems "Beaming New Life Into Fiber", Osicom Technologies, Inc., (late 1997).

Data Sheet, "200 GHz Channel Spacing Dense Wavelength Division Multiplexer DWDM–2 Series," Oplink Communications, Inc., (undated).

Data Sheet, "Wavelength Division Wideband Bandsplitter WDBS–15 Series," Oplink Communications, Inc., (undated).

(List continued on next page.)

*Primary Examiner*—Tesfaldet Bocure
(74) *Attorney, Agent, or Firm*—Fulbright & Jaworski LLP

(57) ABSTRACT

A Clock timing and Data Recovery (CDR) circuit for reconstructing a clock signal from a high speed data signal that contains no clock signal, such as data in a Non-Return-to-Zero format, and is particularly suitable for high data rate optical communication systems. The circuit uses a reference clock with a frequency that is sufficiently close to the data rate, to keep the circuit tuned to the correct frequency even when input data is absent. When input data is present, a quadrature downconverter mixes the reference clock with a series of pulses corresponding to the transition points of the data signal to produce two intermediate signals. These intermediate signals each go through baseband or intermediate band filters, whose outputs are then quadrature modulated to produce the correct output clock signal. Since the filters operate in a much lower frequency range than the associated data rate, the filters can be comparatively simple and economical, and exhibit superior resistance to aging and environmental effects. A wide range of data rates can be accommodated just by changing the frequency of the reference clock, without having to change the filter parameters. For networks that permit a variety of data rates to be used, automatic data rate detection can allow the correct reference clock frequency to be determined and selected for each incoming data message.

17 Claims, 2 Drawing Sheets

U.S. PATENT DOCUMENTS

| | | |
|---|---|---|
| 4,037,922 | 7/1977 | Claypoole . |
| 4,049,414 | 9/1977 | Smith . |
| 4,072,400 | 2/1978 | Claypoole et al. . |
| 4,081,500 | 3/1978 | Malcolm . |
| 4,083,625 | 4/1978 | Hudson . |
| 4,088,386 | 5/1978 | Hawk . |
| 4,100,008 | 7/1978 | Claypoole . |
| 4,102,561 | 7/1978 | Hawk et al. . |
| 4,105,284 | 8/1978 | Olshansky . |
| 4,125,388 | 11/1978 | Powers . |
| 4,135,779 | 1/1979 | Hudson . |
| 4,211,610 | 7/1980 | McGowan . |
| 4,280,827 | 7/1981 | Murphy et al. . |
| 4,328,018 | 5/1982 | Siegfried . |
| 4,351,658 | 9/1982 | Olshansky . |
| 4,360,371 | 11/1982 | Blankenship et al. . |
| 4,375,694 | 3/1983 | Kuhn .................................. 375/376 |
| 4,385,802 | 5/1983 | Blaszyk et al. . |
| 4,394,626 | 7/1983 | Kurihara et al. ........................ 331/12 |
| 4,395,270 | 7/1983 | Blankenship et al. . |
| 4,396,409 | 8/1983 | Bailey et al. . |
| 4,413,882 | 11/1983 | Bailey et al. . |
| 4,415,230 | 11/1983 | Keck . |
| 4,436,368 | 3/1984 | Keck . |
| 4,437,870 | 3/1984 | Miller . |
| 4,453,961 | 6/1984 | Berkey . |
| 4,478,489 | 10/1984 | Blankenship et al. . |
| 4,486,212 | 12/1984 | Berkey . |
| 4,494,968 | 1/1985 | Bhagavatula et al. . |
| 4,494,969 | 1/1985 | Bhagavatula . |
| 4,500,043 | 2/1985 | Brown . |
| 4,501,602 | 2/1985 | Miller et al. . |
| 4,514,205 | 4/1985 | Darcangelo et al. . |
| 4,528,009 | 7/1985 | Sarkar . |
| 4,531,959 | 7/1985 | Kar et al. . |
| 4,549,781 | 10/1985 | Bhagavatula et al. . |
| 4,561,871 | 12/1985 | Berkey . |
| 4,578,097 | 3/1986 | Berkey . |
| 4,590,602 | 5/1986 | Wolaver ............................... 375/375 |
| 4,592,619 | 6/1986 | Weidel . |
| 4,599,732 * | 7/1986 | LeFever ............................... 375/348 |
| 4,636,405 | 1/1987 | Mensah et al. . |
| 4,662,307 | 5/1987 | Amos et al. . |
| 4,671,938 | 6/1987 | Cook . |
| 4,692,615 | 9/1987 | Mensah et al. . |
| 4,704,151 | 11/1987 | Keck . |
| 4,715,679 | 12/1987 | Bhagavatula . |
| 4,718,929 | 1/1988 | Power et al. . |
| 4,750,802 | 6/1988 | Bhagavatula . |
| 4,751,441 | 6/1988 | Lewis . |
| 4,763,970 | 8/1988 | Berkey . |
| 4,831,315 | 5/1989 | Hammond et al. . |
| 4,857,884 | 8/1989 | O'Malley et al. . |
| 4,887,280 | 12/1989 | Reisenfeld ........................... 375/377 |
| 4,947,409 * | 8/1990 | Raith et al. ........................... 375/346 |
| 4,972,483 | 11/1990 | Carey . |
| 5,040,188 | 8/1991 | Lang et al. . |
| 5,105,292 | 4/1992 | Le Roy et al. . |
| 5,144,465 | 9/1992 | Smith . |
| 5,162,937 | 11/1992 | Heidemann et al. . |
| 5,176,728 | 1/1993 | Fugate et al. . |
| 5,224,183 | 6/1993 | Dugan . |
| 5,351,239 | 9/1994 | Black et al. . |
| 5,371,813 | 12/1994 | Artigue . |
| 5,386,239 * | 1/1995 | Wang et al. ......................... 375/261 |
| 5,477,224 | 12/1995 | Sinnock . |
| 5,483,277 | 1/1996 | Granger . |
| 5,486,489 | 1/1996 | Goldstein et al. . |
| 5,497,260 | 3/1996 | Jurek et al. . |
| 5,497,264 | 3/1996 | Bayart et al. . |
| 5,497,385 | 3/1996 | Schmuck . |
| 5,500,755 | 3/1996 | Sierens et al. . |
| 5,502,586 | 3/1996 | Ohnsorge . |
| 5,504,827 | 4/1996 | Schimpe . |
| 5,506,723 | 4/1996 | Junginger . |
| 5,509,952 | 4/1996 | Moore et al. . |
| 5,510,926 | 4/1996 | Bayart et al. . |
| 5,517,232 | 5/1996 | Heidemann et al. . |
| 5,521,752 | 5/1996 | Heidemann et al. . |
| 5,521,909 | 5/1996 | Holloway et al. . |
| 5,521,914 | 5/1996 | Mavraganis et al. . |
| 5,522,007 | 5/1996 | Drouart et al. . |
| 5,528,283 | 6/1996 | Burton . |
| 5,539,734 | 7/1996 | Burwell et al. . |
| 5,544,192 | 8/1996 | Pfeiffer . |
| 5,544,272 | 8/1996 | Carratt et al. . |
| 5,546,378 | 8/1996 | Wirth et al. . |
| 5,546,414 | 8/1996 | Pfeiffer . |
| 5,550,667 | 8/1996 | Krimmel et al. . |
| 5,555,338 | 9/1996 | Haag et al. . |
| 5,557,439 | 9/1996 | Alexander et al. . |
| 5,561,553 | 10/1996 | Marcerou et al. . |
| 5,563,876 | 10/1996 | Duxbury et al. . |
| 5,567,794 | 10/1996 | Barraud et al. . |
| 5,570,218 | 10/1996 | Sotom . |
| 5,572,347 | 11/1996 | Burton et al. . |
| 5,572,614 | 11/1996 | Lucas, Jr. . |
| 5,574,816 | 11/1996 | Yang et al. . |
| 5,576,874 | 11/1996 | Czerwiec et al. . |
| 5,590,233 | 12/1996 | Carratt et al. . |
| 5,594,576 | 1/1997 | Sutherland et al. . |
| 5,594,823 | 1/1997 | Tardy et al. . |
| 5,595,669 | 1/1997 | Le Bris . |
| 5,598,493 | 1/1997 | Bonham, Jr. et al. . |
| 5,598,498 | 1/1997 | Comezzi . |
| 5,600,473 | 2/1997 | Huber . |
| 5,612,805 | 3/1997 | Fevrier et al. . |
| 5,612,808 | 3/1997 | Audouin et al. . |
| 5,612,975 * | 3/1997 | Becker et al. ........................ 375/319 |
| 5,613,023 | 3/1997 | Guillon et al. . |
| 5,621,842 | 4/1997 | Keller . |
| 5,625,728 | 4/1997 | Tardy et al. . |
| 5,625,735 | 4/1997 | Di Maggio et al. . |
| 5,629,994 | 5/1997 | Huber et al. . |
| 5,633,973 | 5/1997 | Vincent et al. . |
| 5,636,308 | 6/1997 | Personne et al. . |
| 5,640,268 | 6/1997 | Chesnoy . |
| 5,640,698 * | 6/1997 | Shen et al. ........................... 375/316 |
| 5,647,884 | 7/1997 | Overton et al. . |
| 5,649,038 | 7/1997 | Boniort et al. . |
| 5,649,043 | 7/1997 | Adams et al. . |
| 5,650,231 | 7/1997 | Barraud et al. . |
| 5,652,808 | 7/1997 | Duchet et al. . |
| 5,655,040 | 8/1997 | Chesnoy et al. . |
| 5,661,553 | 8/1997 | Auge et al. . |
| 5,661,585 | 8/1997 | Feldman et al. . |
| 5,661,833 | 8/1997 | Omati . |
| 5,663,818 | 9/1997 | Yamamoto et al. . |
| 5,668,652 | 9/1997 | Hashomoto et al. . |
| 5,673,129 | 9/1997 | Mizrahi et al. . |
| 5,673,352 | 9/1997 | Bauer et al. . |
| 5,682,454 | 10/1997 | Gaillard . |
| 5,684,297 | 11/1997 | Tardy . |
| 5,687,014 | 11/1997 | Czerwiec et al. . |
| 5,687,041 | 11/1997 | Lee et al. . |
| 5,689,607 | 11/1997 | Vincent et al. . |

OTHER PUBLICATIONS

Data Sheet, "200 GHz Wavelength Division Add/Drop Multiplexer WADM-2 Series," Oplink Communications, Inc., (undated).

Data Sheet, "Customer Product Specification," Alcatel, (undated).

Data Sheet, "LG 1600FXH Clock and Data Regenerator," Microelectronics Group, Lucent Technologies, (Feb. 1997).

Data Sheet, "LG 1605DXB Limiting Amplifier," Microelectronics Group, Lucent Technologies, (Feb. 1997).

Data Sheet, "FRM5W231DR 2.5 Gb/s APD Detector Preamp," Lightwave Components & Modules Catalog, Fujitsu, p. 114–117, 133, (undated).

Data Sheet, "FMM311CG/DG GaAs Integrated Circuit Laser Driver," Lightwave Components & Modules Catalog, Fujitsu, p. 134–137, (1997).

Press Release, "Osicom's Dense Wavelength Division Multiplexer (DWDM) Breaks Price Barrier for Metropolitan Service Providers," Osicom Technologies, Inc., (Nov. 24, 1997).

Presentation, "Osicom Technologies—GigaMux Introduction," originally submitted as part of AS Brochure, Osicom Technologies, (Jun. 24, 1997).

* cited by examiner

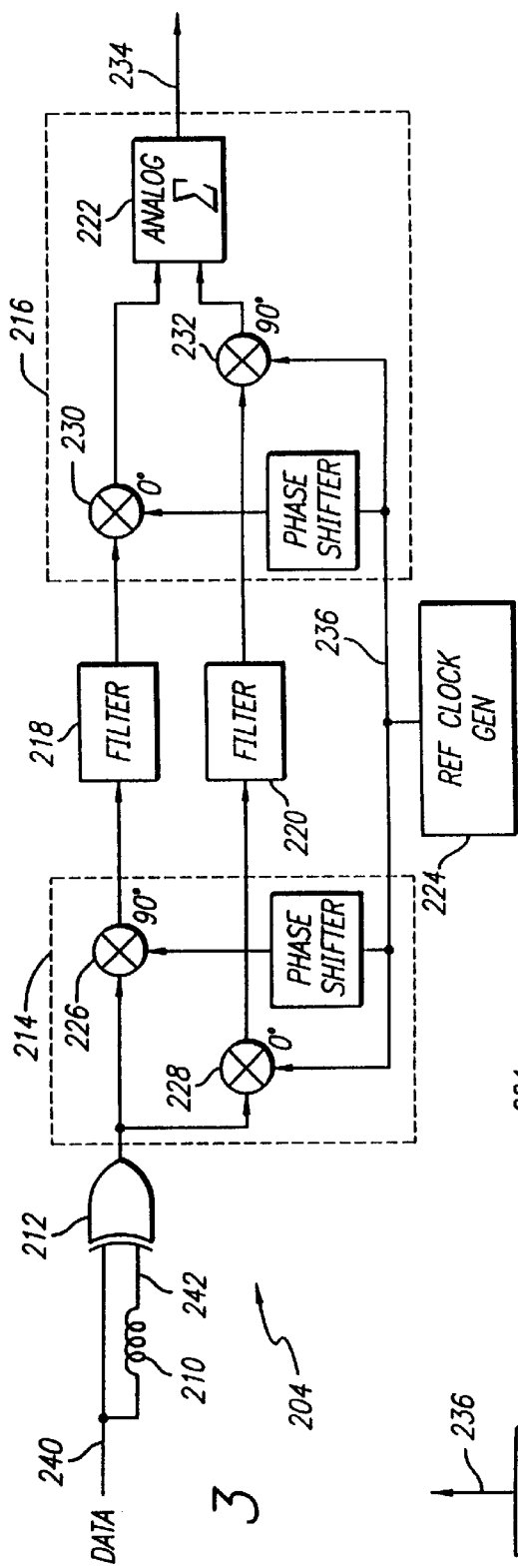
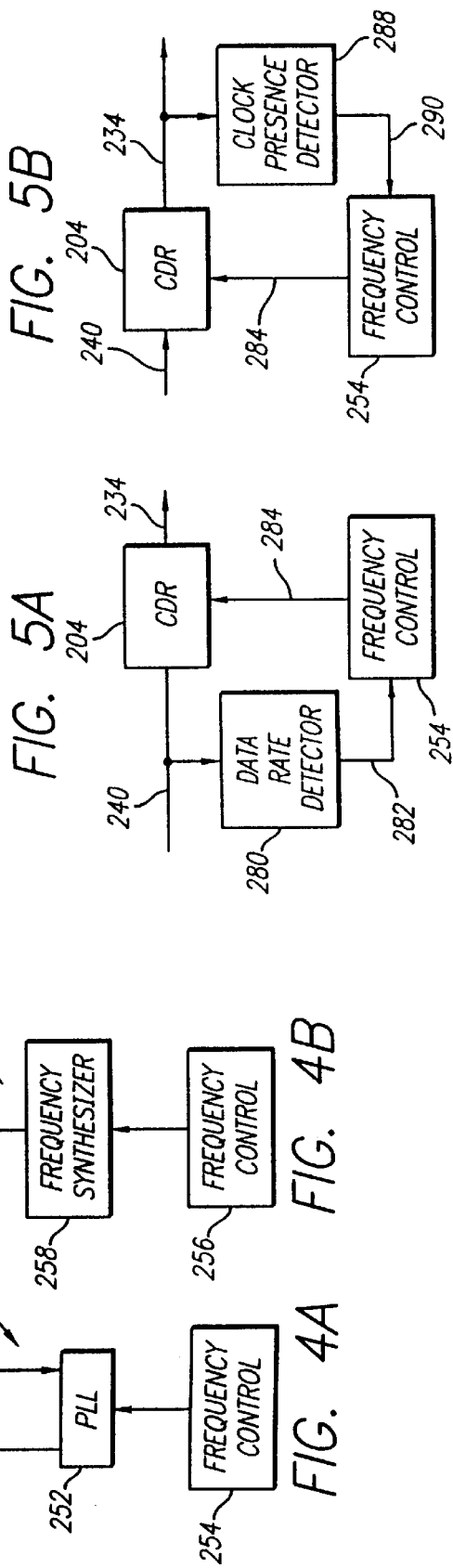

FLEXIBLE CLOCK AND DATA RECOVERY MODULE FOR A DWDM OPTICAL COMMUNICATION SYSTEM WITH MULTIPLE CLOCK RATES

BACKGROUND OF THE INVENTION

1. Field of the Invention

The invention pertains to a fast acquisition Clock Data Recovery (CDR) circuit for use in a communications system that does not transmit a clock signal separately from the data. The invention is particularly adapted for use in DWDM optical communication systems in which the data may be transmitted at various clock rates.

2. Description of the Related Technology

High-speed communications networks have become the backbone of the information industry. Due to constant technological improvements, data rates and capacities of these networks have grown rapidly in recent years and will continue to do so for the foreseeable future. Telecommunications services such as the Internet, wide area networks (WAN) and local area networks (LAN) are rapidly expanding. The related terminal equipment and transmission equipment have to be added to and/or replaced frequently to accommodate expansion and technological advances. Such replacement is expensive and becomes even more so when the new equipment has to operate compatibly with other older equipment which is still in the network. This requirement for compatibility between different generations of communications technology must be satisfied if the benefits of technological progress are to be fully realized.

Digital communications require not only the data itself but also a clock, so that the receiving station can synchronize on that data. It is possible to transmit the clock and the data separately on separate channels, but this is prohibitively expensive for long-distance communications, so other solutions have been found to achieve synchronization at the receiver. Most older communications devices can handle only one data rate, making synchronization relatively simple. But these have to be replaced by new equipment if the system is upgraded to a new data rate signal or even the same data rate but with a different format. These devices are impractical in systems that have a variable data rate requirement.

Some current communications receivers operate with an independent system clock, which must operate at several times the speed of the data. Thus the data rate is only a fraction of the rate which the components are capable of handling. These systems either operate on rather low data rates or require expensive working components that are capable of handling the high clock speeds necessary to handle high data rates.

A number of techniques have been developed to avoid these problems. One is to embed the clock signal in the data so that it can be extracted by the receiver. However, this requires devoting a portion of the bandwidth to clock content rather than data content, which can unnecessarily limit the data throughput.

Other methods have been found to artificially create a clock at the receiving end based on the signal transitions between data bits. This works well with data signal conventions which provide a transition with every bit, but becomes more complicated for transmission conventions that don't have a transition associated with every bit. An example of the latter is the Non-Return-to-Zero (NRZ) standard. Under this standard, a '1' bit can be represented by a binary transition (from high-to-low or low-to-high), while a '0' bit can be represented by no transition. The use of this standard has a number of advantages, but makes it more difficult to extract a clock signal from the transmitted data. For example, transmitting ten consecutive zero bits would result in no signal transitions for ten consecutive clock cycles, so the receiving circuit must 'remember' the correct clock frequency for some period of time to avoid losing synchronization. There are also no transitions during the 'dead' time between transmissions. After such a period of no data, when synchronization has been lost, the receiver must be able to quickly determine the correct clock frequency of a new transmission, or 'lock' onto the data, from the irregularly spaced series of transitions. Thus, such a circuit has two primary requirements: 1) it must rapidly synchronize on a new data rate, 2) it must not excessively drift away from the existing data rate when a series of non-transitions occurs in the data signal.

Data circuits have been developed for the specific purpose of reconstructing a clock signal from such data streams, based on the data signal transitions. They are generally known under the generic term "Clock timing and Data Recovery" (CDR) circuits. For NRZ data, these circuits examine the existing transitions in the input data, artificially generate a clock based generally on these transitions, and maintain this clock during those periods of no transitions. To maintain an accurate clock during a period of no transitions (i.e., a series of '0' bits in the data), any change in clock speed must be kept at an acceptably low level. But synchronizing on a new data rate requires the clock speed to change quickly, thus creating a conflict between quickly determining the clock and accurately maintaining clock.

For low data rates, these problems might be solved fairly simply by incorporating a microprocessor-based algorithm that analyzed the transitions. But modern high-speed communications systems can operate at speeds of several hundred megahertz (MHz) up to several gigahertz (GHz), which is many times faster than even the fastest microprocessors could directly analyze. To perform clock signal reconstruction on such high-speed data, conventional receivers usually employ a bandpass filter or some device operating-like a bandpass filter such as a phase lock loop (PLL), with the operation frequency (central frequency) very close to the input signal frequency (data rate) in the CDR. For efficiently extracting the clock information, the filter has to have a very narrow bandpass (i.e., a very high Q-value). On the other hand, if the CDR is to operate on some frequency range (such as 10% of the central frequency), and to pick up (or lock on) the clock information easily, the Q-value should be lower. Obviously, there is a tradeoff in the requirements for these filters. A high Q-value allows faster detections of the correct clock speed, while a lower Q-value allows a wider range of clock speeds to be detected. Thus, conventional CDRs have been very limited for use in communications systems with potentially changeable data rates, or for products intended to serve a wide range of data rate needs. The problem is exacerbated in dense wavelength division multiplexed (DWDM) optical transmission systems used in local area and wide area networks and the like, in which data from multiple users and multiple equipment types is to be transmitted at different data rates over a common optical fiber link, and it is desired to use a recovered clock signal to condition each signal prior to and/or after transmission over the shared link, to thereby minimize the effects of interference with other signals being transmitted over that same fiber.

The popular data transmission convention referred to as Non-Return-to-Zero (NRZ) has no clock in its signal spectrum. This format generates a binary signal transition from one binary state to the other (either high-to-low or low-to-high) to represent a '1' bit and produces no transition to represent a '0' bit. The opposite association can also be used, with a '0' represented by a transition and a '1' by no transition. In either case, non-linear circuit operations are used to reproduce a clock signal from the data waveform, which must be filtered and processed because there are many clock transitions that do not appear in the data waveform. In conventional CDR circuits, a narrow bandpass filter is used for extracting the clock information. The filter "builds" the clock energy and, if its band width is narrow enough relative to data speed, its "inertia," also known as its Q, will generate clock signals even when transitions are absent. As a rule of thumb, the Q of the filter has to be significantly higher than the maximum expected number N of no-transition bits. As an example, if N=25, Q should be in the range of 500 to 1,000, a very high figure for analog filters.

High-Q high-frequency analog filters are generally complicated and poorly suited for this use, as they suffer the aging and environmental effects common with analog parts. Phase Lock Loops (PLL) are a better choice for such filters, as they are more convenient, economical, flexible, and are self-correcting as to aging effects. However, the operational frequency of a PLL is rather narrowfor rapidly acquiring and efficiently extracting the system clock information, and the continuing evolution of increasing telecommunications speeds could limit the usefulness of a conventional PLL-based CDR or require upgraded capacities.

What is needed is a flexible clock timing and data recovery (CDR) circuit for high speed communications (up through the multiple gigahertz range) which can rapidly detect and maintain clock speeds within a wide range of speeds, from data formats including NRZ data, and that achieves these results at a minimum cost in terms of lost data, functionality, reliability, purchase price and operational expense.

SUMMARY OF THE INVENTION

It is an object of the invention to provide a CDR with a very wide operating frequency range.

It is a further object of the invention to produce a CDR with a fast acquisition time.

It is a further object of the invention to produce a CDR with high stability, high resistance to aging and environmental effects, and low cost.

It is a further object of the invention to provide a CDR which does not require locking the reference frequency to the recovered clock signal, thereby permitting fast acquisition without any phase-frequency detectors.

It is a further object of the invention to provide a CDR which converts a high frequency data stream signal to a lower frequency intermediate signal to thereby more robust clock extraction processing over a wider range of frequencies.

It is a further object of the invention to provide a CDR which can adapt to a wide range of data rates by simply changing the frequency of a reference signal.

This invention achieves the aforementioned objectives with a Clock timing and Data Recovery (CDR) circuit, especially useful in any NRZ communication channel, including without limitation, dense wavelength division multiplexing (DWDM) optical communications systems.

The present invention uses one or more reference frequencies, preferably in the form of a variable frequency generated by a voltage controlled oscillator (VCO). The reference frequency is combined with a signal which has been extracted from the incoming data stream, preferably by combining the incoming digital data stream with a delayed version of itself to produce a modified digital signal in which each transition is represented by a single pulse. This modified signal and the reference frequency are then mixed in a phase quadrature down-converter, the I and Q outputs of which are fed through a matched pair of lowpass filters to isolate any component of the modified signal which is centered about the reference frequency, thereby removing any noise, higher order harmonics or other extraneous signals. Since the passband of the filters is less than the expected deviation between the clock frequency to be recovered and the reference frequency, the filters do not remove any component of the modified signal corresponding to the fundamental frequency of the clock signal to be recovered. The two filtered outputs are then upconverted by means of a quadrature modulator to remove the original reference signal. The output of the quadrature modulator is the desired clock signal, which can then be used to recover the original data stream, and which may also be used to switch the VCO to another frequency in the event that the clock frequency is not known a priori and/or is subject to change.

The CDR circuit of the invention allows for fast locking and recovery because the clock regeneration circuitry is never allowed to drift too far from its desired operating state. These and other features and advantages of the invention will become apparent from the detailed description and accompanying figures that follow.

DESCRIPTION OF THE DRAWINGS

FIG. 3 shows a schematic of an embodiment of a CDR.

FIGS. 4A and 4B show functional schematics of reference signal generation and selection circuits.

FIGS. 5A and 5B show functional schematics of data clock rate detection circuits.

DETAILED DESCRIPTION OF THE PREFERRED EMBODIMENT

Figure 1:
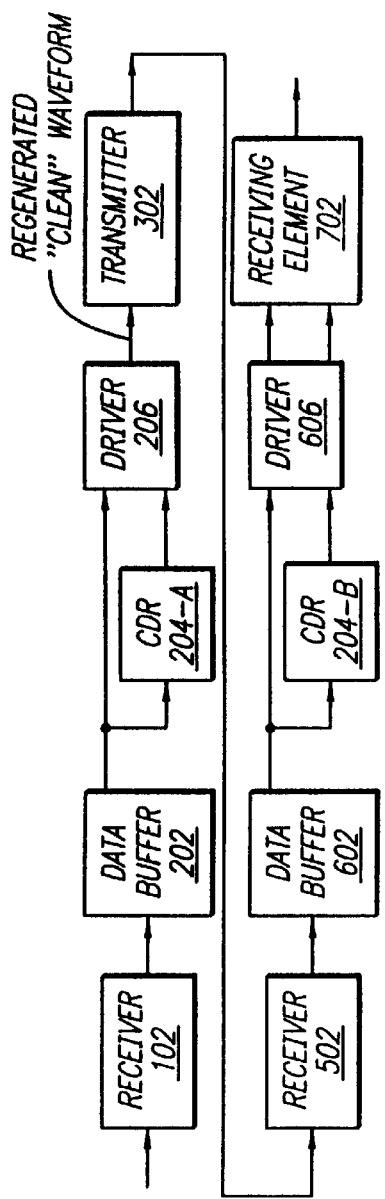
FIG. 1 is a block diagram of a communications system that includes a CDR.

FIG. 1 depicts a preferred embodiment of an optical communications system 100 utilizing CDR's 204-A and 204-B of the present invention. Components 102 through 302 represent a "repeater" station for strengthening and regenerating a received signal for retransmission, while components 502 through 702 represent a receiving station. A repeater station may not always be necessary. In the case of an original transmission, the NRZ signal may be generated in any known manner from the information to be transmitted and the clock. CDR's 204-A and 204-B can be identical except for their placement in the surrounding circuitry. In this figure the data signal, which can be an NRZ waveform, is generated from receiver 102, passes through data buffer 202 and is sent to both CDR 204-A and driver 206. The system clock is regenerated by CDR 204-A and is sent to the input of the driver 206, where it can subsequently be used to accurately clock the data out for transmission. The data is regenerated by driver 206 to produce a 'clean' (i.e., undistorted) waveform, and sent to transmitter 302. Transmitter 302 converts this clean waveform signal to an optical signal and sends it to a fiber-optic medium 400 for transmission. At the receiving station, receiver 502 receives the optical signal, converts it to an electrical data signal, and sends the data to buffer 602. This data may contain some distortion and some added noise created by electrical-optical (E/O) conversion, optical transmission, and optical-electrical (O/E) conversion. Buffer 602 sends this data to CDR 204-B and driver 606. CDR 204-B extracts the clock information from the data, generates a system clock and sends it to driver 606. Based on the data coming from buffer 602 and system clock coming from CDR 204-B, driver 606 can generate clean data and clock signals and send them to receiving element 702, from where they can be further processed by the receiving station.

Figure 2:
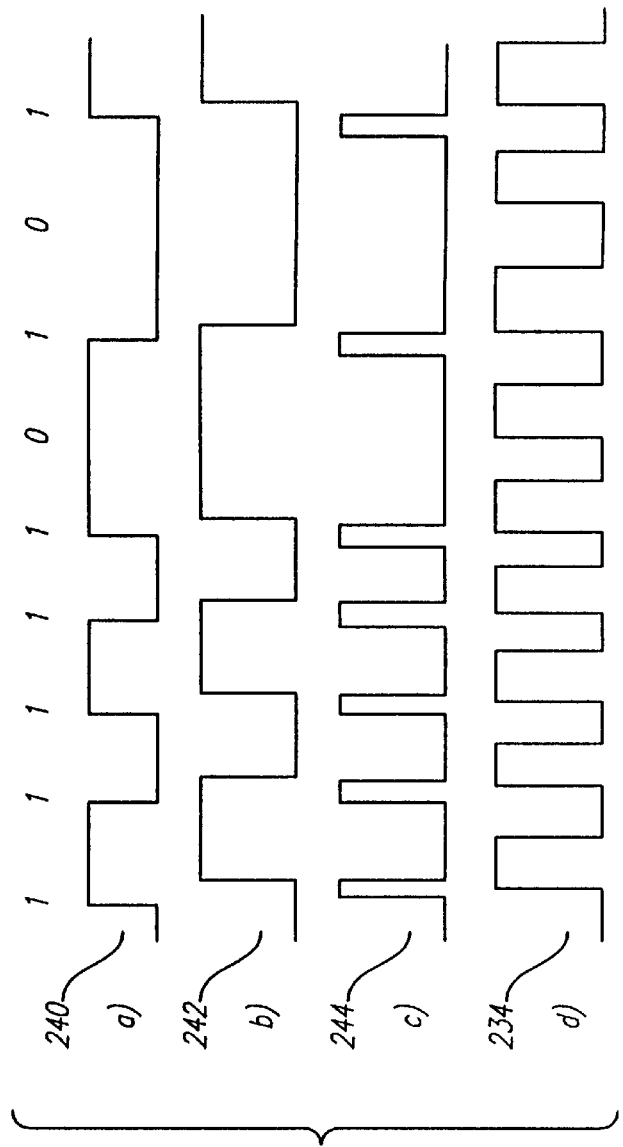
FIG. 2 shows a timing chart of data, clock, and some intermediate signals.

As shown in FIG. 2, when NRZ input data signal 240 is exclusive-OR'd (XOR'd) to delayed version 242 of itself, it produces a series of fixed-duration pulses 244 corresponding to the transitions in the NRZ signal. This train of irregularly-spaced pulses can then be processed to be used to generate a clock.

As shown in FIG. 3, the invention uses a technique referred to as "add & cancel" in which an auxiliary VCO is used only to convert the signal to a convenient frequency for processing (baseband or IF), which is then converted again to cancel the VCO signal. The analog circuitry can exhibit very low aging effects (Q is very low), as the processing has been converted to a comparatively low frequency, and low-frequency analog filters are better able to maintain their stability and accuracy. The lower frequencies can also permit Digital Signal Processors (DSP's) to be used for processing.

FIG. 3 shows that data signal 240 is delayed by delay element 210, which can be any conventional delay element that is suitable for the signal characteristics. Signal 240 and delayed signal 242 can then be exclusive-OR'd with each other to produce the pulse signal 244. Signal 244 then goes to quadrature down-converter 214, where it is mixed with reference frequency signal 236 at mixer 228, and is also mixed with a 90-degree phase-shifted version of reference signal 236 at mixer 226. The reference signal 236 is generated by clock reference circuit 224. In a preferred embodiment, the frequency of reference signal 236 can be the same as the expected clock and data rate of the input data signal, such as 2,488 GHz. The results of these two mixing operations, which can be thought of as two separate channels, are then fed to matched low-pass filters 220 and 218 respectively, which are designed for linear operation in the band pass region (which should be at least the anticipated maximum deviation between the VCO frequency and the clock frequency), and which preferably have a relatively sharp cutoff outside that region. In an exemplary embodiment, these filters can be 5-pole Butterworth filters with a pass band below about 0.5MHz. The outputs of filters 218, 220 are then fed to quadrature modulator 216, where the output of filter 218 is mixed with reference signal 236, while the output offilter 220 is mixed with the 90-degree phase-shifted version of reference signal 236. By reversing which channel is mixed with the phase-shifted reference signal (as compared with the pre-filter mixing), the components of the original reference signal are effectively removed from both channels. This is because the filters do nothing to change the reference frequency, which is a continuous sinewave. A linear filter can change only amplitude or phase of a continuous sinewave, so the frequency is left unchanged. Thus, remixing with reversed phase shift causes the reference frequency to cancel itself. This is the essence of the "add and cancel" aspect of the invention.

At this point, regardless of phase, the fundamental frequency component of the desired clock signal is contained in one or the other (or a linear combination of both) of the outputs of mixers 230 and 232. These two outputs can then be added in summation circuit 222 to produce the clock signal 234. Referring back to FIG. 1, this clock signal can then be fed from CDR circuit 204-B to driver 606, which feeds both this clock signal and the data signal from buffer 602 to receiving element 702.

The processing just described can be done in baseband, or in IF, by appropriate selection of the filter characteristics (for example, a filter having an upper cutoff frequency of about 0.1 MHz–1.0 MHz for baseband, or an upper cutoff frequency of about 5–10 MHz for IF). In either case, processing in a lower frequency range (compared to the data signals) simplifies the filter design by avoiding complex demands on its stability or aging characteristics. Because the reference frequency is closely matched to the data rate frequency, this circuit is always "tuned," and the only delay time to generate the output clock is the propagation delay of the filters. Changing the circuit to operate on a different data rate can be accomplished simply by changing the reference frequency to match that data rate - no changes to the filters are needed. Since the frequencies used in data transmission are usually standards, like OC-3, OC-12, OC-48 (2,488 Gb/s), or the evolving OC-196 and higher, the necessary reference frequencies can either be synthesized or derived from suitably controlled a free running oscillator.

FIGS. 4A and 4B show two types of reference clock circuits 224 that can be used in an exemplary preferred embodiment to provide multiple reference frequencies and select one of those frequencies for use. In FIG. 4A, PLL 252 drives VCO 250, which feeds back a stabilizing signal to PLL 252 to maintain a frequency lock to a control signal derived from a relatively inexpensive crystal, but which still outputs the accurate high frequency reference signal 236 desired for operation with a relatively narrow passband filter. Control circuit 254 permits multiple PLL frequencies to be produced by selecting and providing the correct control signals 284 to the PLL. Control circuit 254 can take various forms. It can include multiple crystals of differing frequencies for the PLL, with a circuit to select the proper crystal from which is derived the PLL's input. It might also contain a single crystal oscillator whose output is divided in various ways to produce the desired signals at 284, with control circuit 254 controlling the divide ratio. In FIG. 4B an alternate form of reference clock circuit is shown in which reference clock 236 is output by frequency synthesizer 258, whose output frequency is controlled by control signals 284 from frequency control circuit 254. Frequency synthesizer 258 might include a VCO, with multiple precision voltage references being provided and selected by control circuit 254 for delivery to the VCO via signals 284. Each voltage reference would cause the VCO to output a different frequency for reference clock 236. However the basic clock signal is generated, it can be divided or multiplied with suitable circuits to produce a variety of frequencies that are higher or lower than the basic frequency. The details of such circuits to generate multiple frequencies and select one of them are known to those of ordinary skill in the art, and are not further described here. FIGS. 4A and 4B merely illustrate some of the possible circuits that can allow a variety of reference frequencies 236 to be produced, thus expanding the range of data frequencies that can be effectively handled by the CDR.

If the clock rate of the incoming data signal is unknown, such as would be the case on a network that allows different users to operate at different speeds, a reference clock generator 224 incorporating one of the above-mentioned externally controlled multiple frequency selection circuits can be used to quickly determine the correct data clock speed so that the correct reference frequency may be selected for proper operation. Fortunately, most networks users are limited to a predetermined set of standard clock rates, so the possible choices are known in advance and the reference clock generator 224 can be configured to produce only these frequencies.

FIGS. 5A and 5B show two basic approaches to determining the incoming data clock frequency. FIG. 5A shows a front-end detection circuit 280 that independently monitors the input data rate. Upon detection of the correct rate, a signal 282 can be fed to frequency control circuit 254, which selects the corresponding frequency for reference clock generator 224. This front end detector might take the form of multiple narrow-band filters, each sampling the incoming data signal and each tuned to a specific input data frequency. Only the filter tuned to the incoming data frequency would provide an output signal, which would then be fed back to control circuit 254. Such a parallel approach could provide fast detection, but would be relatively expensive due to the need for a separate detection circuit for each possible clock rate.

FIG. 5B shows the presently preferred back-end approach, having a clock presence detector 288 which monitors the CDR output 234 for a clock signal 290. An acceptable clock signal (i.e., clean and free of jitter) will be produced only when the CDR frequency is close to the incoming data clock rate. The reference clock generator can sequentially step through each of the possible clock rates, remaining at each rate for a predetermined period before moving to the next rate. If an acceptable clock signal is detected at the CDR output, this fact can be fed back accepted signed 290 to a clock stepper control, which then causes the reference clock to remain on that frequency for the duration of the incoming data, or until data lock is once again lost. If an acceptable clock signal is not detected at the CDR output within the predetermined time period, the clock stepper control can cause the reference clock generator to advance to the next preselected reference clock rate. This trial-and-error approach is relatively inexpensive, but can require longer to determine the correct rate and acquire data lock, especially if there are numerous possible data rates to try. The choices of front-end vs. back-end detection, and parallel vs. sequential detection, must be based on the relative importance of equipment cost, maximum allowable detection time, and number of possible clock rates to select from.

The foregoing description of the invention is intended to be illustrative and not restrictive. Other modifications will occur to those of skill in the art, for example by replacing certain analog components with equivalent digital circuitry and/or a programmable digital signal processor. These modifications are intended to be encompassed by the invention, which is limited only by the scope and spirit of the appended claims.

What is claimed is:

1. A clock data recovery circuit, comprising:
   a reference clock circuit having a reference clock output for producing at least one reference clock frequency;
   a receive data circuit having
      a receive data input for receiving an input data signal,
      a delay element having a delay element input and a delay element output, and
      an exclusive-OR circuit having:
         a first exclusive-OR input for receiving said input data signal and coupled to said delay element input,
         a second exclusive-OR input coupled to said delay element output, and
         an exclusive-OR output for providing a receive data output;
   a quadrature downconverter having first and second downconverter inputs and first and second downconverter outputs, said first downconverter input coupled to said receive data output and said second downconverter input coupled to said reference clock output;
   a first filter circuit having a first filter input and a first filter output, said first filter input coupled to said first downconverter output;
   a second filter circuit having a second filter input and a second filter output, said second filter input coupled to said second downconverter output; and
   a quadrature modulator having
      a first modulator input coupled to said first filter output,
      a second modulator input coupled to said second filter output,
      a reference input coupled to said reference clock output, and
      a data clock output for providing a data clock signal in response to the first and second modulator inputs.

2. The circuit of claim 1, wherein said reference clock frequency corresponds to an industry standard.

3. The circuit of claim 1, wherein said reference clock circuit includes at least one voltage controlled oscillator.

4. The circuit of claim 1, wherein said reference clock circuit includes a frequency synthesizer.

5. The circuit of claim 1, wherein said reference clock circuit includes a voltage controlled oscillator.

6. The circuit of claim 1, wherein said quadrature downconverter includes:
   a first converter having
      a first converter input coupled to said receive data output,
      a second converter input coupled to said reference clock output,
      a first converter output coupled to said first filter input,
      a first mixer coupled between said first converter input, said second converter input, and said first converter output; and
   a second converter having
      a third converter input coupled to said receive data output,
      a fourth converter input coupled to said reference clock output,
      a second converter output coupled to said second filter input,
      a second mixer coupled between said third converter input and said second converter output, and
      a phase-shifting circuit for shifting said reference clock signal, said phase-shifting circuit coupled between said fourth converter input and said second mixer.

7. The circuit of claim 6, wherein said quadrature modulator includes:
   a third converter having:
      a fifth converter input coupled to said first filter output,
      a sixth converter input coupled to said reference clock output,
      a third converter output,
      a third mixer coupled between said fifth converter input and said third converter output,
      a phase-shifting circuit for shifting said reference clock signal, said phase-shifting circuit coupled between said sixth converter input and said third mixer;

a fourth converter having
  a seventh converter input coupled to said second filter output,
  an eighth converter input coupled to said reference clock output,
  a fourth converter output,
  a fourth mixer coupled between said seventh converter input, said eighth converter input, and said fourth converter output; and
a summation circuit having
  a first summation input coupled to said third converter output,
  a second summation input coupled to said fourth converter output, and
  a summation output coupled to said data clock output.

8. The circuit of claim 1, wherein at least one of said first and second filter circuits includes a Butterworth filter.

9. The circuit of claim 1, wherein said circuit operates in baseband and said first and second filter circuits each have a bandpass in the range of 0.1–1.0 megahertz.

10. The circuit of claim 1, wherein said circuit operates in IF and said first and second filter circuits each have a bandpass in the range of 5–10 megahertz.

11. The circuit of claim 1, wherein said input data signal has a non-return-to-zero format.

12. A method of reconstructing a clock signal from a data signal, comprising the steps of:
  receiving the data signal;
  producing a delayed data signal by delaying said data signal;
  exclusive-ORing said data signal with said delayed data signal to thereby produce an input signal containing a pulse corresponding to each transition of said data signal;
  quadrature downconverting said input signal with a reference signal to produce a first intermediate signal and a second intermediate signal;
  filtering said first intermediate signal to produce a third intermediate signal;
  filtering said second intermediate signal to produce a fourth intermediate signal; and
  quadrature modulating said third and fourth intermediate signals with said reference signal to produce said clock signal.

13. The method of claim 12, wherein the received data signal is a non-return-to-zero signal.

14. The method of claim 12, wherein the step of quadrature downconverting said input signal includes the steps of:
  mixing said input signal with said reference signal to produce said second intermediate signal;
  phase shifting said reference signal to produce a first phase shifted reference signal; and
  mixing said input signal with said first phase-shifted reference signal to produce said first intermediate signal.

15. The method of claim 14, wherein the step of quadrature modulating said third and fourth intermediate signals includes the steps of:
  mixing said third intermediate signal with said reference signal to produce a fifth intermediate signal;
  phase shifting said reference signal to produce a second phase-shifted reference signal;
  mixing said fourth intermediate signal with said second phase-shifted reference signal to produce a sixth intermediate signal; and
  adding said fifth and sixth intermediate signals to produce said clock signal.

16. The method of claim 12, wherein:
  the step of filtering said first intermediate signal includes the step of passing said first intermediate signal through a first Butterworth filter; and
  the step of filtering said second intermediate signal includes the step of passing said second intermediate signal through a second Butterworth filter.

17. The method of claim 12, further comprising the step of using said clock signal to clock said data signal.

* * * * *